(12) United States Patent
Doxey

(10) Patent No.: US 12,454,204 B2
(45) Date of Patent: Oct. 28, 2025

(54) ROUND LATCH FOR A VEHICLE SEAT

(71) Applicant: GM GLOBAL TECHNOLOGY OPERATIONS LLC, Detroit, MI (US)

(72) Inventor: Kyle M. Doxey, Saline, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 459 days.

(21) Appl. No.: 17/982,614

(22) Filed: Nov. 8, 2022

(65) Prior Publication Data
US 2024/0149754 A1   May 9, 2024

(51) Int. Cl.
*B60N 2/20* (2006.01)
*B60N 2/02* (2006.01)

(52) U.S. Cl.
CPC ............ *B60N 2/20* (2013.01); *B60N 2/02253* (2023.08)

(58) Field of Classification Search
CPC ... B60N 2/10; B60N 2/14; B60N 2/20; B60N 2/22; B60N 2/235; B60N 2/2356; B60N 2/236
USPC ...................... 296/65.01, 65.05, 65.09, 65.16
See application file for complete search history.

(56) References Cited

U.S. PATENT DOCUMENTS

| | | | | |
|---|---|---|---|---|
| 9,248,761 B2 * | 2/2016 | Nagura | ................. | B60N 2/235 |
| 9,376,036 B2 * | 6/2016 | Wei | ................. | B60N 2/2356 |
| 9,902,297 B2 * | 2/2018 | Robinson | ............... | B60N 2/236 |
| 10,259,352 B2 * | 4/2019 | Kim | ................. | B60N 2/236 |
| 10,414,295 B2 * | 9/2019 | Maeda | ................. | B60N 2/236 |
| 11,260,777 B2 | 3/2022 | Naik et al. | | |
| 11,872,915 B2 * | 1/2024 | Teraguchi | ............. | B60N 2/236 |
| 2008/0238171 A1* | 10/2008 | Kojima | ................. | B60N 2/236 297/362 |
| 2015/0321585 A1* | 11/2015 | McCulloch | .......... | B60N 2/2358 297/367 P |
| 2019/0255979 A1* | 8/2019 | Zahn | ....................... | B21F 37/00 |

OTHER PUBLICATIONS

German Office Action for German Application No. 102023110502. 7; dated Apr. 1, 2025; 6 pages.

* cited by examiner

*Primary Examiner* — Jason S Daniels
(74) *Attorney, Agent, or Firm* — CANTOR COLBURN LLP

(57) ABSTRACT

A vehicle seat is provided. The vehicle seat includes a seat cushion, a seat back, and a round latch connected to both the seat cushion and the seat back. The round latch includes a lock plate consisting of two sets of locking apertures and a guide plate including one or more pawls configured to selectively engage the two sets of locking apertures. A first of the two sets of locking apertures corresponds to a stowed position of the vehicle seat and a second of the two sets of locking apertures corresponds to a seating position of the vehicle seat.

20 Claims, 7 Drawing Sheets

ROUND LATCH FOR A VEHICLE SEAT

INTRODUCTION

The subject disclosure relates to seat latches. In particular, the invention relates to a round latch for a vehicle seat.

Automotive vehicles include vehicle seat assemblies designed to support a seated occupant in the vehicle. The seat assemblies include a generally horizontal seat cushion and a seat back pivotally connected to the seat cushion. In many vehicle seats, a recliner assembly is provided to allow adjustment of the seat back relative to the seat cushion between a plurality of recline positions. However, in other vehicle seats, where adjustment of the seat back relative to the seat cushion between a plurality of recline positions is not provided, the seats often include a latch mechanism that allows the seat back to be folded flat against the seat cushion.

Currently, latches used for such vehicle seats are substantially larger than the recliner assemblies used for similar seats. As a result, recliner assemblies, commonly known as disc recliners, are often modified and used to act as latches.

SUMMARY

In one exemplary embodiment, a vehicle seat is provided. The vehicle seat includes a seat cushion, a seat back, and a round latch connected to both the seat cushion and the seat back. The round latch includes a lock plate consisting of two sets of locking apertures and a guide plate including one or more pawls configured to selectively engage the two sets of locking apertures. A first of the two sets of locking apertures corresponds to a stowed position of the vehicle seat and a second of the two sets of locking apertures corresponds to a seating position of the vehicle seat.

In addition to one or more of the features described herein, the round latch also includes an upper bracket affixes to the round latch to the seat back and a lower bracket that affixes the round latch to the seat cushion.

In addition to one or more of the features described herein, each aperture of the two sets of locking apertures includes a tapered edge portion.

In addition to one or more of the features described herein, the first of the two sets of locking apertures is offset from the second of the two sets of locking apertures by at least ninety degrees.

In addition to one or more of the features described herein, each aperture of the two sets of locking apertures includes a first set of locking teeth configured to engage a second set of locking teeth disposed on the one or more pawls.

In addition to one or more of the features described herein, the round latch also includes a cam configured to control a radial position of the one or more pawls.

In addition to one or more of the features described herein, the vehicle seat also includes a latch handle configured to rotate the cam.

In another exemplary embodiment, a vehicle having at least one seat is provided. The vehicle seat includes a seat cushion, a seat back, and a round latch connected to both the seat cushion and the seat back. The round latch includes a lock plate consisting of two sets of locking apertures and a guide plate including one or more pawls configured to selectively engage the two sets of locking apertures. A first of the two sets of locking apertures corresponds to a stowed position of the vehicle seat and a second of the two sets of locking apertures corresponds to a seating position of the vehicle seat.

In addition to one or more of the features described herein, the round latch also includes an upper bracket affixes to the round latch to the seat back and a lower bracket that affixes the round latch to the seat cushion.

In addition to one or more of the features described herein, each aperture of the two sets of locking apertures includes a tapered edge portion.

In addition to one or more of the features described herein, the first of the two sets of locking apertures is offset from the second of the two sets of locking apertures by at least ninety degrees.

In addition to one or more of the features described herein, each aperture of the two sets of locking apertures includes a first set of locking teeth configured to engage a second set of locking teeth disposed on the one or more pawls.

In addition to one or more of the features described herein, the round latch also includes a cam configured to control a radial position of the one or more pawls.

In addition to one or more of the features described herein, the vehicle seat also includes a latch handle configured to rotate the cam.

In yet another exemplary embodiment, a round latch for a vehicle seat is provided. The round latch includes a lock plate consisting of two sets of locking apertures and a guide plate including one or more pawls configured to selectively engage the two sets of locking apertures. A first of the two sets of locking apertures corresponds to a stowed position of the vehicle seat and a second of the two sets of locking apertures corresponds to a seating position of the vehicle seat In addition to one or more of the features described herein, the round latch also includes an upper bracket configured to affixes to a seat back and a lower bracket that configured to affix to a seat cushion.

In addition to one or more of the features described herein, each aperture of the two sets of locking apertures includes a tapered edge portion.

In addition to one or more of the features described herein, the first of the two sets of locking apertures is offset from the second of the two sets of locking apertures by at least ninety degrees.

In addition to one or more of the features described herein, each aperture of the two sets of locking apertures includes a first set of locking teeth configured to engage a second set of locking teeth disposed on the one or more pawls.

In addition to one or more of the features described herein, the round latch also includes a cam configured to control a radial position of the one or more pawls The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In accordance with an exemplary embodiment, a round latch for a vehicle seat is provided. The round latch includes an upper bracket that is affixed to a seat back and a lower bracket that is affixed to a seat cushion. The round latch has a latch puck that is configured to control the movement of the seat back relative to the seat cushion. In exemplary embodiments, the latch puck includes a guide plate that selectively engages a lock plate to control the movement of the seat back relative to the seat cushion. In one embodiment, the latch plate only includes two sets of locking apertures, one that corresponds to a stowed position of the vehicle seat and another that corresponds to a seating position of the vehicle seat.

Figure 1:
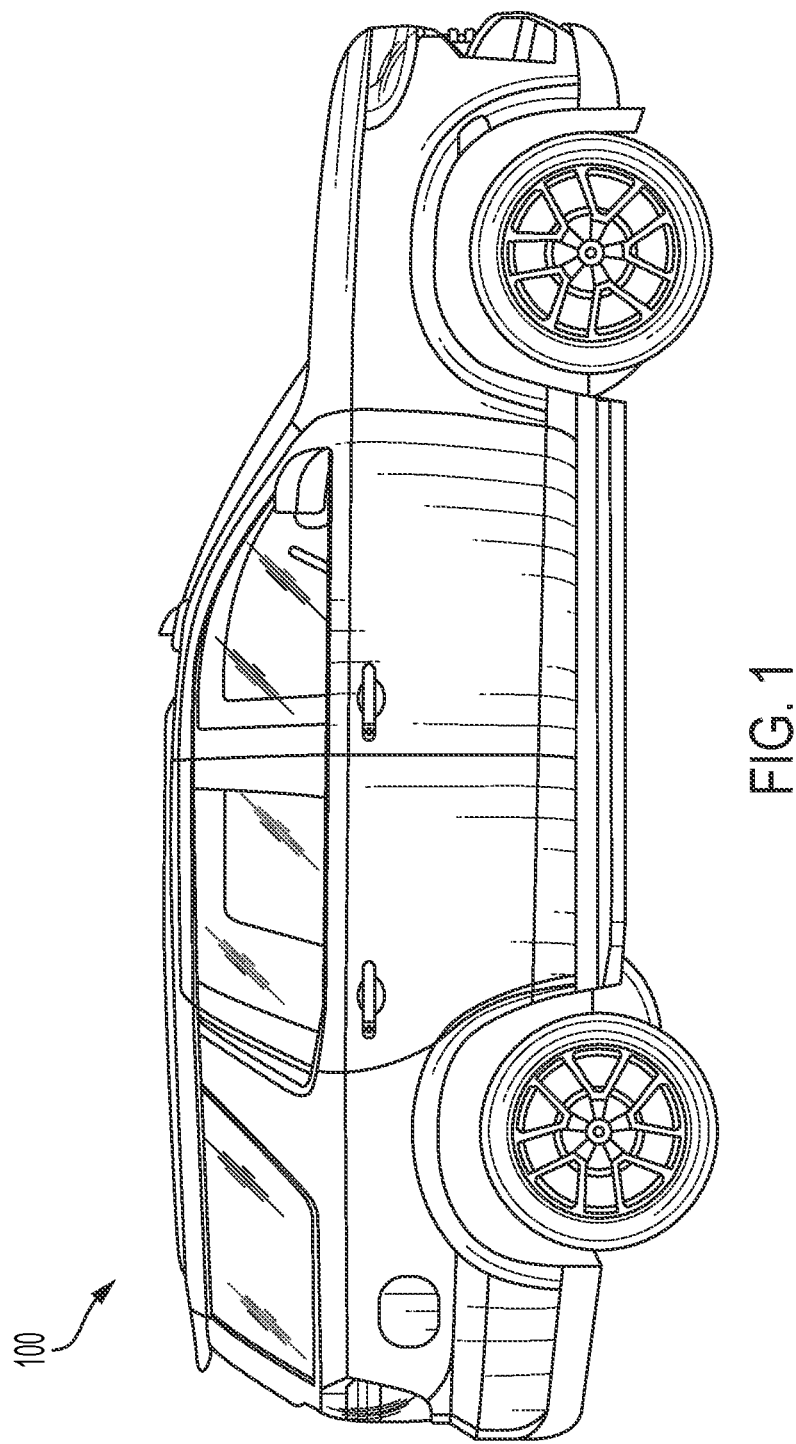
FIG. 1 is a schematic diagram of a vehicle for use in conjunction with one or more embodiments of the present disclosure.

Referring now to FIG. 1, a schematic diagram of a vehicle 100 for use in conjunction with one or more embodiments of the present disclosure is shown. The vehicle 100 includes a plurality of seats (not shown). In exemplary embodiments, the vehicle includes at least one seat that is configured with a round latch as disclosed herein.

Figure 2:
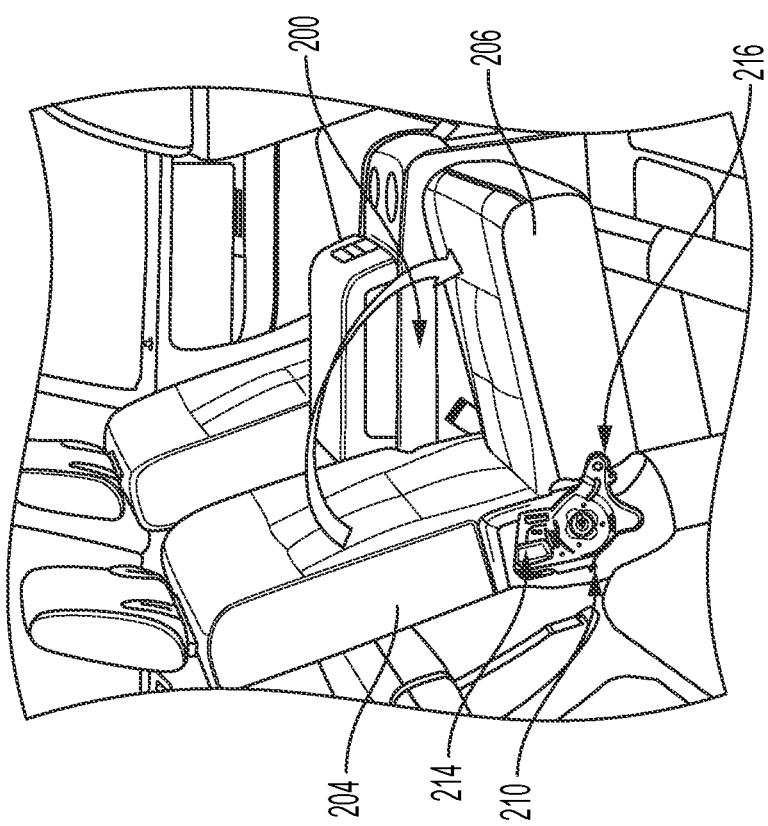
FIG. 2 is a schematic diagram of a vehicle seat having a round latch in accordance with one or more embodiments of the present disclosure.

Referring now to FIG. 2, a schematic diagram of a vehicle seat 200 having a round latch 210 in accordance with one or more embodiments of the present disclosure is shown. The vehicle seat 200 includes a seat back 204 and a seat cushion 206 that are respectively affixed to the round latch 210 by an upper bracket 214 and a lower bracket 216. In exemplary embodiments, the round latch 210 is configured to lock the vehicle seat 200 into either a seating position (as shown) or into a stowed position (not shown), where the seat back is substantially parallel with the seat cushion.

Figure 3A:
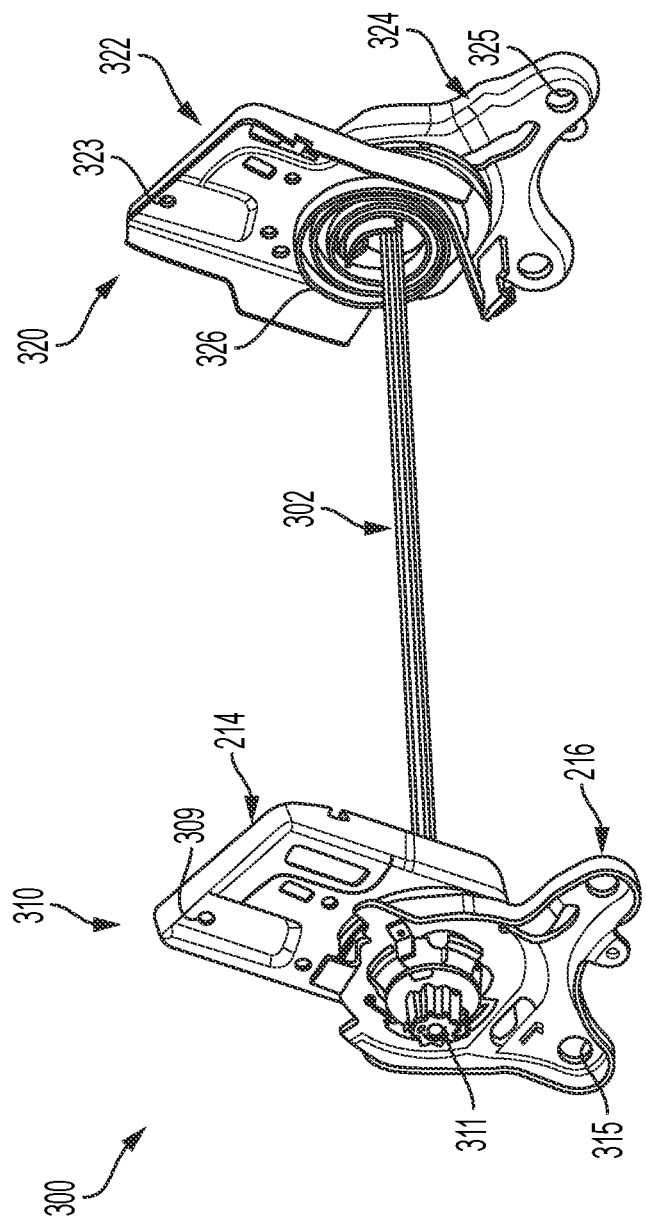
FIG. 3A is a schematic diagram of a round latch for a vehicle seat in accordance with one or more embodiments of the present disclosure.

Referring now to FIG. 3A, a schematic diagram of a round latch assembly 300 for a vehicle seat in accordance with one or more embodiments of the present disclosure is shown. As illustrated, the round latch assembly 300 includes a first-round latch 310 and a second-round latch 320 that are configured to be disposed on opposite sides of a vehicle seat.

The first-round latch 310 is coupled to the second-round latch 320 by a cross rod 302. The round latch assembly 300 includes a handle attachment 311 that attaches to a handle (not shown), which is configured to operate the round latch assembly 300.

The first-round latch 310 includes an upper bracket 312 that is configured to affix to a seat back (not shown) via one or more apertures 309. The first-round latch 310 also includes a lower bracket 314 that is configured to affix to a seat cushion (not shown) via one or more apertures 315. Similarly, the second-round latch 320 includes an upper bracket 322 that is configured to affix to a seat back (not shown) via one or more apertures 323 and a lower bracket 324 that is configured to affix to a seat cushion (not shown) via one or more apertures 325.

Figure 3B:
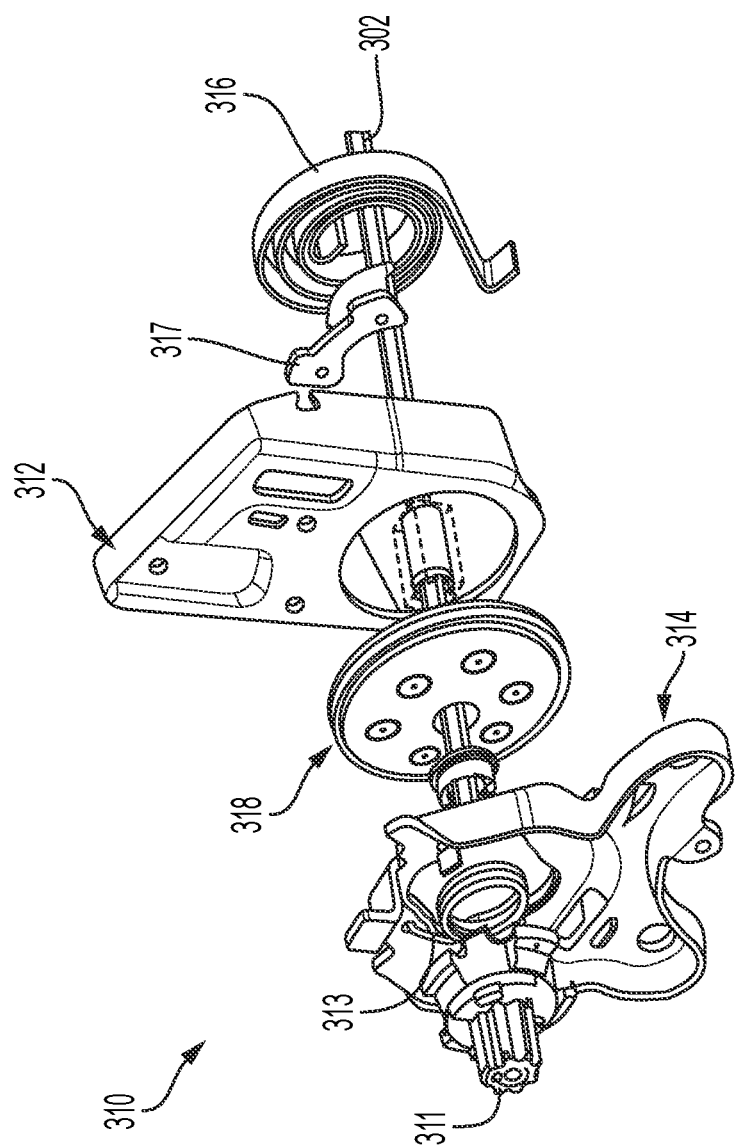
FIG. 3B is a partially disassembled view of a round latch for a vehicle seat in accordance with one or more embodiments of the present disclosure.

Referring now to FIG. 3B, a partially disassembled view of a round latch 310 for a vehicle seat in accordance with one or more embodiments of the present disclosure is shown. As illustrated, the round latch 310 includes a handle attachment 311, an upper bracket 312, a handle return spring 313, a lower bracket 314, a seat back return spring 316, a return spring attachment 317, and a latch puck 318. In exemplary embodiments, the upper bracket 312 is affixed to a seat back (not shown), the lower bracket 314 is affixed to a seat cushion (not shown), and the latch puck 318 is affixed to both the upper bracket 312 and the lower bracket 314.

In exemplary embodiments, the latch puck 318 is configured to selectively lock the vehicle seat into one of a seating position and a stowed position responsive to input from the handle attachment 311. For example, when the handle attachment 311 is rotated by a user against the force of the handle return spring 313, the latch puck 318 selectively disengages and allows the upper bracket 312 to rotate about the cross rod 302. In one embodiment, when the latch puck 318 is disengaged, the seat back return spring 316 exerts a rotational force on the upper bracket 312 to encourage the movement of the seat back to a seating position. In one embodiment, the rotational force is sufficient to return the seat back to the seating position without additional force from a user. In another embodiment, the rotational force is not sufficient to return the seat back to the seated position without additional force from a user but is rather designed to reduce the amount of force the user must provide to return the seat to the seated position.

Figure 4B:
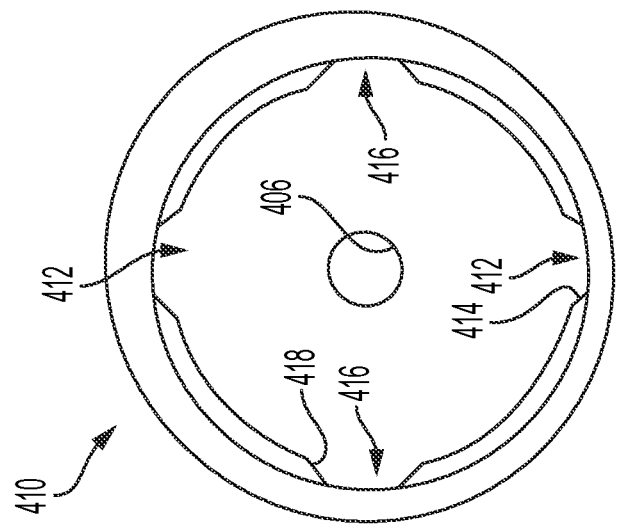
FIG. 4B is a schematic diagram of a lock plate of a latch puck for use in conjunction with one or more embodiments of the present disclosure.
Figure 4A:
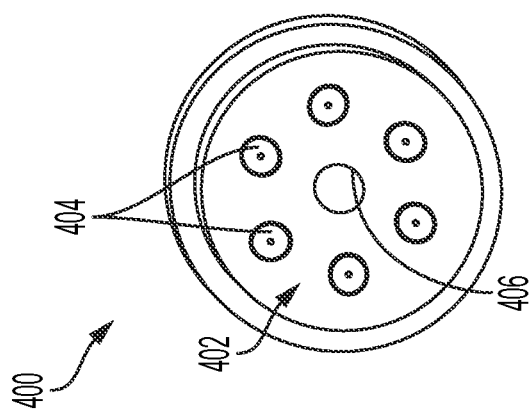
FIG. 4A is a schematic diagram of a latch puck for use in conjunction with one or more embodiments of the present disclosure.

Referring now to FIG. 4A, a schematic diagram of a latch puck 400 for use in conjunction with one or more embodiments of the present disclosure is shown. In exemplary embodiments, the latch puck 400 is formed by combining a lock plate, such as the one shown in FIG. 4B, and a guide plate, such as the one shown in FIG. 4C. As shown, the latch puck 400 includes a first outer surface 402 that includes a plurality of attachment points 404 that are configured to selectively engage one of the upper bracket and the lower bracket of the round latch (not shown). Although not shown, the latch puck 400 also includes a second outer surface that has a plurality of attachment points 404 that are configured to selectively engage the other of the upper bracket and the lower bracket that is not engaged by the first outer surface 402. The latch puck 400 also includes a central aperture 406 that is configured to receive the cross rod (not shown).

Referring now to FIG. 4B a schematic diagram of a lock plate 410 of a latch puck for use in conjunction with one or more embodiments of the present disclosure is shown. As illustrated, the lock plate 410 includes a first set of locking apertures 412 and a second set of locking apertures 416. In one embodiment, the first set of locking apertures 412 are configured to receive pawls of a guide plate and to lock the vehicle seat into a seating position. In one embodiment, the second set of locking apertures 416 are configured to receive pawls of a guide plate and to lock the vehicle seat into a stowed position. In one embodiment, the first set of locking apertures 412 is offset from the second set of locking apertures 416 by approximately ninety degrees. The lock plate 410 also includes central aperture 406 that is configured to receive the cross rod (not shown).

In exemplary embodiments, each aperture of the first set of locking apertures 412 includes a tapered side portion 414 that is configured to guide the pawl of the guide plate into the aperture 412 and to provide a snug fit between the aperture 412 and the pawl. Likewise, each aperture of the second set of locking apertures 416 includes a tapered side portion 418 that is configured to guide the pawl of the guide plate into the aperture 416 and to provide a snug fit between the aperture 416 and the pawl.

Figure 4C:
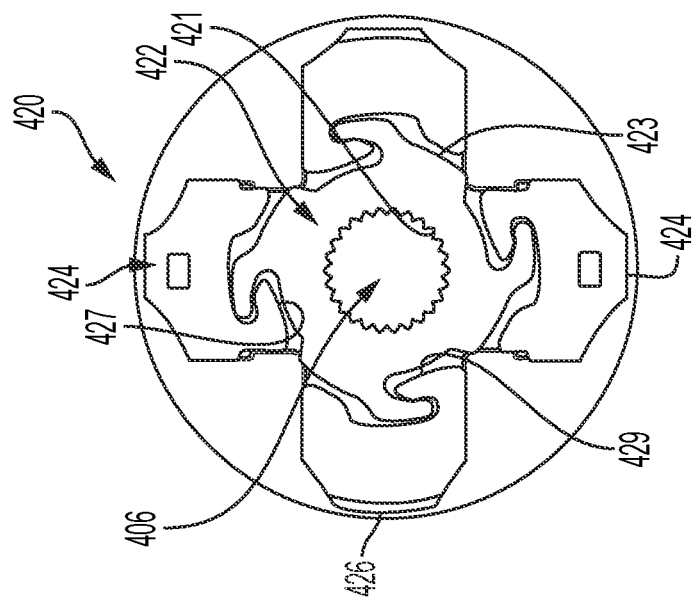
FIG. 4C is a schematic diagram of a guide plate of a latch puck in a locked position for use in conjunction with one or more embodiments of the present disclosure.
Figure 4D:
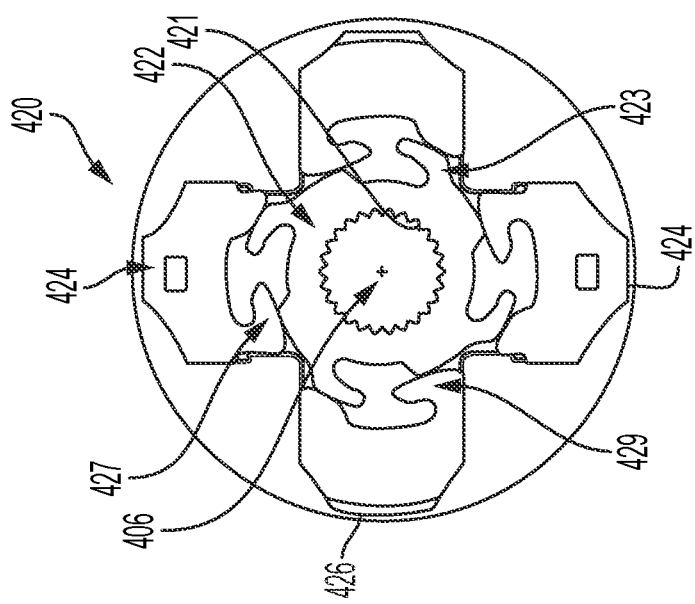
FIG. 4D is a schematic diagram of a guide plate of a latch puck in an unlocked position for use in conjunction with one or more embodiments of the present disclosure.

Referring now to FIGS. 4C and 4D schematic diagrams of a guide plate 420 of a latch puck for use in conjunction with one or more embodiments of the present disclosure are shown. As illustrated, the guide plate 420 includes a central aperture 406 that is configured to receive the cross rod (not shown). The guide plate 420 also includes a cam 422 that has an inner surface 421 that is configured to engage with the cross rod, such that the cam 422 will rotate when the cross rod is rotated.

In exemplary embodiments, the guide plate 420 also includes a first set of pawls 424 and a second set of pawls 426, that are configured to engage with the first set of set of locking apertures 412 and second set of locking apertures 416, shown in FIG. 4B, respectively. As best illustrated in FIG. 4C, when the guide plate 420 is in a locked position, the pawls 424, 426 are extended radially and are engaged with the locking apertures 412, 416, respectively. In contrast, as best illustrated in FIG. 4D, when the guide plate 420 is in a unlocked position, the pawls 424, 426 are drawn radially towards the CAM and are not engaged with the locking apertures 412, 416, respectively. In exemplary embodiments, when the guide plate 420 is in the locked position, the seat back can not be moved relative to the seat cushion and when the guide plate 420 is in the unlocked position, the seat back can be moved relative to the seat cushion.

In exemplary embodiments, the cam 422 includes an outer surface 423 that is configured to selectively engage an inner surface 427, 429 of the pawls 424, 426, respectively. When the cam 422 is rotated in a clockwise manner the outer surface 423 of the cam 422 impacts the inner surface 427, 429 of the pawls 424, 426 and pushes the pawls radially outward. When the cam 422 is rotated in a counterclockwise manner the outer surface 423 of the cam 422 engages with the inner surface 427, 429 of the pawls 424, 426 and pulls the pawls radially inward. In this manner, by rotating the cross rod and cam 422 the radial position of the one or more pawls 424, 426 can be controlled.

Figure 5A:
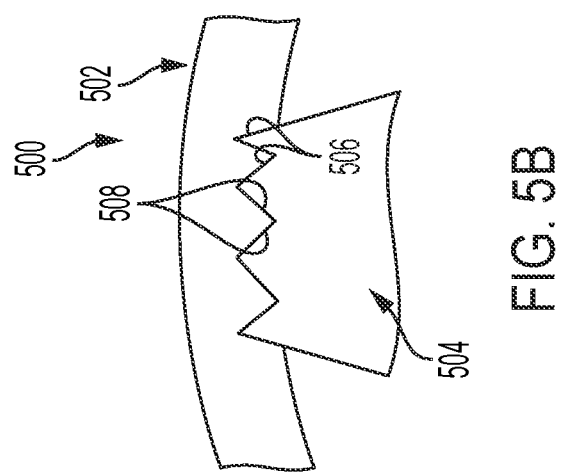
FIG. 5A is a schematic diagram of a portion of a lock plate disengaged from a guide plate of a latch puck for use in conjunction with one or more embodiments of the present disclosure.
Figure 5B:
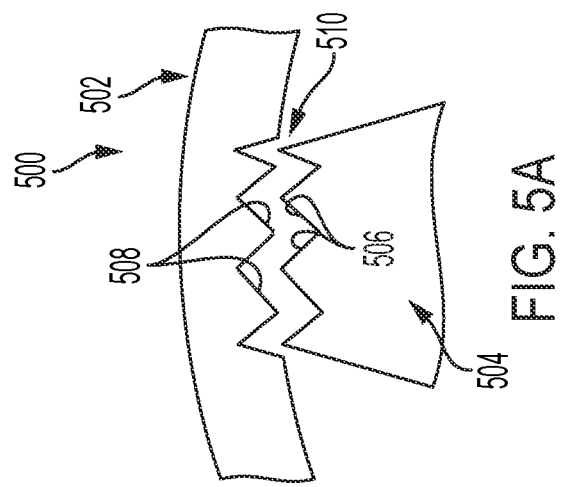
FIG. 5B is a schematic diagram of a portion of the lock plate engaged with a guide plate of a latch puck for use in conjunction with one or more embodiments of the present disclosure.

Referring now to FIGS. 5A and 5B, schematic diagram of a portion of lock plate 502 respectively disengaged from and engaged with a guide plate 504 of a latch puck 500 in accordance with one or more embodiments of the present disclosure is shown. As illustrated, in one embodiment, the locking aperture 510 of the lock plate 502 includes one or more teeth 508 that are configured to align with teeth 506 of the guide plate 504 to increase the surface area of the contact between the lock plate 502 and the guide. In exemplary embodiments, the number and size of the teeth 506, 508 may be varied based on the design requirements of the latch mechanism.

In exemplary embodiments, a round latch as disclosed herein has a substantially smaller form factor than traditional latch designs. In contrast to disc recliner mechanisms that have been adapted for use as latches, the round latch disclosed herein does not require a restrictor plate to prevent the disc recliner from locking in a position between the seating and stowed position, thereby simplifying the design. Furthermore, the round latch disclosed herein does not include a plurality of teeth disposed around the inner circumference of the lock plate to provide reclining adjustment points. Rather, the lock plate only includes two sets of locking apertures that correspond to a seating position and a lock position. By removing the small locking teeth used as incremental locking points, the overall size of the round latch can be substantially smaller than a disc recliner while still providing the required locking force to prevent unintended movement of the seat back relative to the seat cushion.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle seat comprising:
a seat cushion;
a seat back; and
a round latch connected to both the seat cushion and the seat back, the round latch comprising:
a lock plate consisting of exactly two sets of locking apertures configured to lock the seat in only two discrete positions; and
a guide plate including one or more pawls configured to selectively engage the two sets of locking apertures, wherein a first of the two sets of locking apertures corresponds to a stowed position of the vehicle seat and a second of the two sets of locking apertures corresponds to a seating position of the vehicle seat, and wherein the first set of locking apertures is offset from the second set of locking apertures by at least ninety degrees.

2. The vehicle seat of claim 1, wherein the round latch includes an upper bracket that affixes to the round latch to the seat back and a lower bracket that affixes the round latch to the seat cushion.

3. The vehicle seat of claim 1, wherein each aperture of the two sets of locking apertures includes a tapered edge portion.

4. The vehicle seat of claim 1, wherein each aperture of the two sets of locking apertures includes a first set of locking teeth configured to engage a second set of locking teeth disposed on the one or more pawls.

5. The vehicle seat of claim 1, wherein the round latch further comprises a cam configured to control a radial position of the one or more pawls.

6. The vehicle seat of claim 5, further comprising a latch handle configured to rotate the cam.

7. A vehicle comprising:
at least one seat comprising:
a seat cushion;
a seat back; and
a round latch connected to both the seat cushion and the seat back, the round latch comprising:
a lock plate consisting of exactly two sets of locking apertures configured to lock the seat in only two discrete positions; and
a guide plate including one or more pawls configured to selectively engage the two sets of locking apertures,
wherein a first of the two sets of locking apertures corresponds to a stowed position of the seat and a second of the two sets of locking apertures corresponds to a seating position of the at least one seat, and wherein the first set of locking apertures is offset from the second set of locking apertures by at least ninety degrees.

8. The vehicle of claim 7, wherein the round latch includes an upper bracket that affixes to the round latch to the seat back and a lower bracket that affixes the round latch to the seat cushion.

9. The vehicle of claim 7, wherein each aperture of the two sets of locking apertures includes a tapered edge portion.

10. The vehicle of claim 7, wherein each aperture of the two sets of locking apertures includes a first set of locking teeth configured to engage a second set of locking teeth disposed on the one or more pawls.

11. The vehicle of claim 7, wherein the round latch further comprises a cam configured to control a radial position of the one or more pawls.

12. The vehicle of claim 11, wherein the at least one seat further comprises a latch handle configured to rotate the cam.

13. A round latch for a vehicle seat comprising:
a lock plate consisting of exactly two sets of locking apertures configured to lock the seat in only two discrete positions; and
a guide plate including one or more pawls configured to selectively engage the two sets of locking apertures,
wherein a first of the two sets of locking apertures corresponds to a stowed position of the vehicle seat and a second of the two sets of locking apertures corresponds to a seating position of the vehicle seat, and wherein the first set of locking apertures is offset from the second set of locking apertures by at least ninety degrees.

14. The round latch of claim 13, further comprising an upper bracket configured to affix to a seat back and a lower bracket that is configured to affix to a seat cushion.

15. The round latch of claim 13, wherein each aperture of the two sets of locking apertures includes a tapered edge portion.

16. The round latch of claim 13, wherein each aperture of the two sets of locking apertures includes a first set of locking teeth configured to engage a second set of locking teeth disposed on the one or more pawls.

17. The round latch of claim 13, further comprising a cam configured to control a radial position of the one or more pawls.

18. The vehicle seat of claim 1, wherein the round latch comprises a latch puck formed by combining the lock plate and the guide plate, the latch puck including a central aperture configured to receive a cross rod.

19. The vehicle seat of claim 1, wherein the round latch further comprises a return spring configured to exert a rotational force on the seat back to encourage movement of the seat back to the seating position.

20. The vehicle seat of claim 1, wherein the round latch further comprises a handle return spring configured to return the latch handle to its original position after rotation.

* * * * *